Patented Aug. 29, 1939

2,171,011

UNITED STATES PATENT OFFICE 2,171,011

TREATMENT OF WELLS

Paul G. Shelley, Midland, Mich., assignor to The Dow Chemical Company, Midland, Mich., a corporation of Michigan No Drawing. Application April 25, 1938, Serial No. 204,137

4 Claims. (Cl. 166—21)

The invention relates to the treatment of wells and more particularly those yielding oil or gas from a calcareous formation.

The well-known method of treatment of oil or gas wells in a calcareous formation consists in injecting into the producing formation aqueous hydrochloric acid which has the effect of attacking and dissolving the rock formation, forming flow passages therein which facilitates the delivery of oil or gas into the well. In applying this method, I have found that the desired increased rate of production is not always obtained. This may be due to a number of causes some of which are beyond control. In many cases, however, I have found that the response of the well to the treatment depends upon the manner in which the acid acts upon the formation, and this is susceptible to control according to my discovery. In the case where the formation is quite soluble in the acid, such as when the formation is composed largely of limestone, the acid acts relatively rapidly upon that part of the formation immediately surrounding the well bore. As a consequence only the pores or channels in the immediate vicinity of the well bore become enlarged, those lying beyond being substantially unaffected by the acid, since it becomes spent before deep penetration can be effected.

The principal object of my invention is to provide an improved method of acid treating a well whereby the action of the acid is so controlled as to reduce its rate of action and thereby permit relatively deep penetration to the more remote portions of the producing horizon before the acid becomes spent. A further object is to provide a method of acid treating a well in a calcareous oil or gas producing formation whereby relatively large flow channels are created or enlarged therein without employing an excessively large volume of acid. Other objects and advantages will appear as the description of the invention proceeds.

I have discovered that by including in the hydrochloric acid solution which is introduced into the well and thence into the formation a relatively small proportion of a furan, the rate of reaction of the acid upon limestone is greatly reduced when said reaction is carried out under the pressure existing in deep wells, as for example, at pressures of about 300 to 600 lbs. per sq. in. or more. By the term "a furan" used herein and in the appended claims is meant furan and its nuclear substituents, such as for example, furfural, furoic acid, furfuryl alcohol, hydrofuramide, tetrahydrofurfuryl alcohol, sodium furacrylate and the like. At the pressures above mentioned, the addition of a furan, such as any of the aforesaid compounds, in a relatively small amount, that is from .05 to 5 per cent, greatly reduces the rate of reaction of the acid and thereby permits it to be forced deeply into the formation before it becomes neutralized. By using such agents in the acid introduced into the well, it is possible to enlarge and greatly extend existing flow channels, as well as create new ones through those portions of earth or rock which are sufficiently porous to admit the acid where ordinary hydrochloric acid would become spent in a relatively short time before deep penetration could be effected. I have found that as a result of such treatments greatly increased production is obtainable and that, contrary to the usual result, the increased production of the well is generally sustained for a comparatively long period after the treatment. Thus a given volume of acid not only suffices in many instances to bring about greater increases in production than those obtainable with ordinary hydrochloric acid, but also the increase is sustained for a longer time.

The invention then consists of the method hereinafter fully described and particularly pointed out in the claims.

The treatment contemplated by my process comprises introducing into the well and thence into the surrounding formation an aqueous hydrochloric acid solution in the presence of a relatively small proportion of a furan, such as one of the afore-mentioned group, in amount sufficient to substantially retard the normal rate of reaction of hydrochloric acid on calcium carbonate under the pressures encountered in the well. These agents do not have the effect of inhibiting the reaction of acid on the metals, or of reducing the total amount of limestone that the acid can dissolve. Their principal function appears to be to greatly reduce the rate of reaction of the acid on limestone, thereby giving rise to the advantageous effects aforementioned, namely of permitting deep penetration of the acid, creation of long or extended flow channels, which in turn has the effect of greatly increasing the output of the well, and sustaining this increase for a relatively long time. The proportion of the agent to employ in the acid may be from .05 to 1 per cent or up to as much as 5 per cent or more based upon the weight of the acid solution, depending, however, upon the solubility of the agent in the acid. I generally prefer to use about 1 per cent of the agent, as this amount has proved in practice to be generally satisfactory. The concentration of the hydrochloric acid may be from 5 to 25 per cent of hydrochloric acid by weight, although other concentrations may be used. A generally useful acid concentration is about 15 per cent by weight. If desired, an inhibitor of the action of the acid on metals may be included in the solution, so as to protect the metal parts of the well from attack by acid, since the agents specified for use in my method, although they inhibit the attack of acid on limestone, do not have the effect of inhibiting the effect of the action of acid on metals.

The introduction of the acid solution into the well and thence into the formation may be carried out in any of the ways known to the art, such as for example, those described in U. S. Patents Nos. 1,877,504 and 1,891,667.

As illustrative of the effect of the addition of a furan to an acid solution and its rate of action on limestone, the reaction being carried out under a pressure of about 500 lbs. per sq. in., tests were made on cylindrical limestone cores 1 in. in diameter and ¾ of an in. long, by subjecting them to the action of 13.6 per cent hydrochloric acid with and without the addition of a relatively small amount of a furan. The comparative loss of weight of the core was used as a measure of the retarding effect of the furan. The results of these tests are given in the following table.

Table

| Ex. No. | Furan added to 13.6% hydrochloric acid solution | Weight loss in grams per sq. in. at 500 lbs. per minute | Percent retardation of acid action |
|---|---|---|---|
| 1 | None (blank) | 0.137 | 0 |
| 2 | 1% furfural | 0.0417 | 65 |
| 3 | 1% hydrofuramide | 0.034 | 75 |
| 4 | 1% furoic acid | 0.037 | 73 |
| 5 | 1% furfuryl alcohol | 0.037 | 73 |
| 6 | 1% tetrahydrofurfuryl alcohol | 0.0457 | 66 |
| 7 | 1% sodium furacrylate | 0.0261 | 81 |

From the table it will be seen that the rate at which hydrochloric acid solution dissolves limestone can be retarded to between 65 and 80 per cent of its normal rate of reaction by the addition of a relatively small amount of a furan. Such retardation allows the acid solution to be forced deeply into the formation before it becomes completely spent, resulting in the creation of a greatly enlarged drainage area over that hitherto obtainable with a comparable volume of acid reagent.

It will be noted that although the method has been described with particular reference to oil or gas wells, it need not be limited thereto but may equally well be applied in treating other types of wells, such as those delivering water or brine.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention—

1. In a method of acidizing a well in a calcareous formation with hydrochloric acid, the steps which consist in introducing into the well and thence into the formation aqueous hydrochloric acid solution in the presence of a relatively small proportion of a furan.

2. In a method of acidizing a well in a calcareous formation with hydrochloric acid, the steps which consist in introducing into the well and thence into the formation aqueous hydrochloric acid solution to which is added between about .1 and 5 per cent furfural.

3. In a method of acidizing a well in a limestone formation, the steps which consist in introducing into the well and thence into the formation aqueous hydrochloric acid to which is added between about .1 and 5 per cent furoic acid.

4. In a method of acidizing a well in a limestone formation, the steps which consist in introducing into the well and thence into the formation aqueous hydrochloric acid to which is added between about .05 and 5 per cent furfuryl alcohol.

PAUL G. SHELLEY.